3,513,008
COATED TITANIUM DIOXIDE PARTICLES AND PRODUCTION THEREOF
Leslie John Lawrence, Middlesbrough, England, assignor to British Titan Products Company Limited, Billingham, County Durham, England, a corporation of the United Kingdom
No Drawing. Filed Apr. 4, 1967, Ser. No. 628,286
Claims priority, application Great Britain, Apr. 12, 1966, 15,885/66
Int. Cl. C09c *1/36, 3/02*
U.S. Cl. 106—300      6 Claims

ABSTRACT OF THE DISCLOSURE

Titanium dioxide particles, preferably of pigmentary size, coated with triethanolamine oxide, and which may also be coated with a metal oxide and/or a phosphate. A process for the production of the particles is also claimed wherein the particles are subjected to fluid energy milling during or after coating with triethanolamine oxide.

---

The present invention relates to improved coated titanium dioxide particles, particularly pigmentary titanium dioxide particles, and to processes for their production.

A large number of organic compounds have been disclosed for coating titanium dioxide particles, particularly those of pigmentary particle size. Such compounds have been added for a number of reasons, the most common of which is to improve the dispersibility of the titanium dioxide particles in liquid media, for example in liquid media containing organic compounds such as organic film-forming compounds.

One such organic compound which has been applied to pigmentary titanium dioxide particles for this purpose is triethanolamine.

Coatings of triethanolamine generally improve the dispersibility of titanium dioxide particles in organic liquid media, for example in oleo-resinous surface coating compositions, but have generally been found to retard the drying time of the surface coating compositions thus produced.

It is an object of the present invention to provide improved coated titanium dioxide particles for use in such media.

Accordingly, the present invention comprises titanium dioxide particles coated with triethanolamine oxide.

The invention is also a process for the production of titanium dioxide particles coated with triethanolamine oxide comprising contacting the particles with triethanolamine oxide under conditions wherein triethanolamine oxide is not substantially decomposed and thereafter recovering the coated particles.

The titanium dioxide particles to which the triethanolamine oxide is applied may be predominantly of the rutile or of the anatase modification. It is, however, preferred to apply the compound to particles consisting of at least 90% and preferably at least 95% of the $TiO_2$ in the rutile form and which are preferably pigmentary particles having a mean weight particle size in the range 0.1 to 0.5 micron and particularly one in the range 0.15 to 0.35 micron.

The particles may be prepared by any suitable process, for example by the so-called "sulphate" process or by the oxidation, in the vapour phase, of a titanium tetrahalide such as titanium tetrachloride.

In addition to the coating of triethanolamine oxide the titanium dioxide particles may be coated, if desired, with another compound(s), for example alumina, zirconia, titania, ceria, silica and/or a phosphate (preferably a phosphate of one of the metals of the aforementioned oxides).

Preferred quantities of such coatings are in the range 0.1% to 10%, particularly in the range 0.5% to 5%, by weight on $TiO_2$.

Triethanolamine oxide is a known compound which, when pure, is a white solid apparently having a melting point in the range 103° to 105° and which visibly decomposes at temperatures above about 170° C. The compound is soluble in water, methanol and ethanol. It is only slightly soluble in acetone and n-butanol and less so in heptane, benzene, toluene, diethyl ether and dioxane.

Triethanolamine oxide can be prepared by a number of methods, for example by the reaction of hydroxylamine with ethylene oxide (as described by Jones and Burns, J. Am. Chem. Soc. 47, 2966 (1925)) or by the oxidation of triethanolamine with aqueous hydrogen peroxide (as described, for example in U.S. specifications 2,769,824 and 2,842,542).

It is preferred to use the latter method in the preparation of the compounds for use in the process of the present invention.

Care must be taken in the preparation of triethanolamine oxide by this method to ensure that the triethanolamine does not contain excessive quantities of mono- and/or di-ethanolamine since these are believed to give rise to side reactions which reduce the yield of triethanolamine oxide.

It is preferred in the process of the present invention to contact the titanium dioxide particles with triethanolamine oxide in aqueous solution although, if desired, the titanium dioxide particles can, of course, be contacted with an organic solution, for example the organic solution which is obtained during the preparation of the oxide described in the above U.S. specifications, of the triethanolamine oxide or with the solid compound.

One method of carrying out the process of the present invention is to mix titanium dioxide particles with a solution of triethanolamine oxide of suitable strength and thereafter to pass the resulting mixture, after drying if desired, into a fluid energy mill.

Alternatively, titanium dioxide particles may be contacted with triethanolamine oxide formed in situ, e.g. by the addition of triethanolamine (of suitable purity) and hydrogen peroxide to a suspension, preferably an aqueous suspension, of the titanium dioxide particles.

The particles may then be separated, dried, and, if desired, subjected to other treatments, for example classification, milling and/or bagging. It is preferred, however, that they should not be washed before drying since this tends to remove triethanolamine oxide from the particles.

Whichever method of applying the triethanolamine oxide is chosen, it is preferred that the titanium dioxide particles are contacted with sufficient triethanolamine oxide to retain upon the particles an amount of the oxide in the rage 0.05% to 5% and particularly an amount in the range 0.15% to 0.5%, by weight on $TiO_2$.

The following examples describe embodiments of the present invention:

EXAMPLE 1

To three separate samples of an aqueous slurry (50% by weight) of pigmentary rutile titanium dioxide were added (as a solid in the case of triethanolamine oxide) and with vigorous stirring:

(a) 0.3% by weight on $TiO_2$ of triethanolamine oxide
(b) 0.5% by weight on $TiO_2$ of triethanolamine oxide
(c) 0.3% by weight on $TiO_2$ of triethanolamine The latter sample was for the purpose of comparison and its use as a coating is not according to the present invention.

The additional slurries were then separately dried at 80° C., and the $TiO_2$ milled in a fluid energy mill supplied with compressed air.

The percentage carbon content of the pigments was estimated after milling and was found to be:

(a) 0.15
(b) 0.23
(c) 0.18

(These figures show that a very high proportion of the addition was retained on the pigment.)

The pigments were then separately incorporated into a paint consisting of a (i) commercially obtainable resin (Paralac 10 w.)
(ii) driers (0.2% cobalt and 0.2% lead on the solids content of the resin) and
(iii) solvent to a pigment volume concentration of 18.6%.

The ease of pigment dispersion was the same in all three cases.

Each paint was divided into two samples, one of which was stored for 4 days and the other for 5 days before testing.

The paints were then separately applied to a glass surface at a wet film thickness of $3/1000''$ and the drying time of this film tested on a commercially available Beck-Koller Drying Time Recorder.

The results obtained are shown in the following Table:

| | Drying time (hours) | |
|---|---|---|
| Pigment in paint | 4 day storage | 5 day storage |
| (a) 0.3% triethanolamine oxide | 7¾ | 7½ |
| (b) 0.5% triethanolamine oxide | 7½ | 8¼ |
| (c) 0.3% triethanolamine | 12¼ | 13¾ |

EXAMPLE 2

Hydrogen peroxide (86 ml. of 100 volume) was added to 100 g. (to give about a 10% excess of $H_2O_2$) over a period of 30 minutes with constant stirring. The temperature of the mixture after the addition was complete was 45° C. and this temperature was maintained for two hours, with cooling as necessary. The final mixture contained about 0.76 g. triethanolamine oxide/ml.

The product was added to pigmentary rutile titanium dioxide coating with 2% alumina and 1.5% titania had been recovered by filtration and the resulting mixture was dried at 110° C., pulverised and, finally, fluid energy milled.

The coated pigmentary $TiO_2$ particles thus produced were incorporated into a paint and the drying time of the paint was determined as described in Example 1 after 21 days storage.

Separate samples of the same pigment were heated to 160° C., 180° C. and 210° C. respectively for 12 minutes before being incorporated into a similar paint and the drying time of the resulting paint was determined in the manner described in Example 1.

As a control a similar pigment was coated with a similar quantity of triethanolamine (in place of triethanolamine oxide) incorporated into a paint and the drying time of the paint determined as described above.

The following results were obtained:

| Pigment in paint: | Drying time (in hours) after 21 days storage |
|---|---|
| (1) Coated with triethanolamine oxide and heated to 110° C. | 11½ |
| (2) As above and heated to 160° C. | 9¾ |
| (3) As above and heated to 180° C. | 12¼ |
| (4) As above and heated to 210° C. | 11¼ |
| (5) Control (coated with triethanolamine) | 18¾ |

All pigments, including the control, showed similar ease of incorporation into the paints.

What is claimed is:

1. Titanium dioxide particles coated with triethanolamine oxide in an amount of from 0.05% to 5% by weight on $TiO_2$.

2. Titanium dioxide particles as claimed in claim 1 which are coated with an amount of triethanolamine oxide in the range 0.15% to 0.5% by weight on $TiO_2$.

3. Titanium dioxide particles as claimed in claim 1 having a mean weight particle size in the range 0.15 to 0.35 micron.

4. Titanium dioxide particles as claimed in claim 1 which are also coated with a compound selected from the group alumina, zirconia, titania, ceria, silica, aluminum phosphate, zirconium phosphate, titanium phosphate and cerium phosphate, said compound being present in the range 0.1 to 10% by weight of $TiO_2$.

5. A process for the production of titanium dioxide particles coated with triethanolamine oxide comprising contacting the particles with sufficient triethanolamine oxide to retain upon said particles, when recovered, an amount of triethanolamine oxide of from 0.05% to 5% by weight on $TiO_2$, under conditions wherein the triethanolamine oxide is not substantially decomposed, subjecting the particles to fluid energy milling and thereafter recovering the coated particles.

6. A process as claimed in claim 5 wherein the titanium dioxide particles which are contacted with triethanolamine oxide have been coated with a compound selected from the group alumina, zirconia, titania, ceria, silica, aluminum phosphate, zirconium phosphate, titanium phosphate and cerium phosphate, said compound being present in the range 0.1 to 10% by weight of $TiO_2$.

References Cited

UNITED STATES PATENTS

| | | | |
|---|---|---|---|
| 2,737,460 | 3/1956 | Werner | 106—300 |
| 2,744,029 | 5/1956 | Kingsbury | 106—300 |
| 3,015,573 | 1/1962 | Myers et al. | |
| 3,147,131 | 9/1964 | Kingsbury | 106—300 |
| 3,172,772 | 3/1965 | Rowe | 106—300 |
| 3,412,944 | 11/1968 | Wollenberg | 106—300 XR |
| 3,290,243 | 12/1966 | Sawyer | 106—308 XR |

TOBIAS E. LEVOW, Primary Examiner

H. M. S. SNEED, Assistant Examiner

U.S. Cl. X.R.

106—308; 260—37